United States Patent
Matsutori

(10) Patent No.: US 7,055,373 B2
(45) Date of Patent: Jun. 6, 2006

(54) METHOD AND DEVICE FOR MEASURING INNER DIAMETER DIMENSION OF WORKS

(75) Inventor: Hideki Matsutori, Mitaki (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 65 days.

(21) Appl. No.: 10/468,077

(22) PCT Filed: Feb. 8, 2002

(86) PCT No.: PCT/JP02/01086

§ 371 (c)(1),
(2), (4) Date: Aug. 15, 2003

(87) PCT Pub. No.: WO02/065054

PCT Pub. Date: Aug. 22, 2002

(65) Prior Publication Data

US 2004/0050145 A1  Mar. 18, 2004

(30) Foreign Application Priority Data

Feb. 16, 2001  (JP) .............................. 2001-040669

(51) Int. Cl.
*G01B 13/10* (2006.01)
(52) U.S. Cl. .................................... 73/37.9
(58) Field of Classification Search .................. 73/37.9
See application file for complete search history.

(56) References Cited

U.S. PATENT DOCUMENTS

| | | | | |
|---|---|---|---|---|
| 2,486,052 A | * | 10/1949 | Moore | ......................... 73/37.9 |
| 4,088,009 A | | 5/1978 | Fukuda | |
| 4,776,204 A | * | 10/1988 | Batcher et al. | ............... 73/37.9 |
| 5,176,024 A | * | 1/1993 | Gancarz | ..................... 73/37.5 |
| 5,653,037 A | * | 8/1997 | Hasegawa et al. | ........... 73/37.9 |
| 5,787,596 A | * | 8/1998 | Mishima et al. | ............... 33/533 |
| 6,675,632 B1 | * | 1/2004 | Matsutori | .................... 73/37.9 |

FOREIGN PATENT DOCUMENTS

| | | |
|---|---|---|
| JP | 56-111423 | 9/1981 |
| JP | 63-150078 | 10/1988 |
| JP | 3-19920 | 2/1991 |
| JP | 6-174433 | 6/1994 |

(Continued)

OTHER PUBLICATIONS

Japanese Office Action Dated Nov. 4, 2004 With English Translation.

(Continued)

*Primary Examiner*—Hezron Williams
*Assistant Examiner*—Rose M. Miller
(74) *Attorney, Agent, or Firm*—David S. Safran

(57) ABSTRACT

A method and a device for measuring the inner diameter dimension of a work capable of easily and accurately measuring the inner diameter dimension of the work with a simple structure; the method, comprising the steps of feeding compressed air to the inner peripheral part of a master with a known inner diameter dimension to detect a back pressure, calculating back pressure characteristics showing a relation between the inner diameter dimension and the back pressure from the measured result, feeding compressed air to the inner peripheral part of the work based to be measured to detect a back pressure, and measuring the inner diameter characteristics, whereby the inner diameter dimension of the work can be measured without rotating the work.

13 Claims, 6 Drawing Sheets

FOREIGN PATENT DOCUMENTS

| | | |
|---|---|---|
| JP | 8-029642 | 2/1996 |
| JP | 8-155794 | 6/1996 |
| JP | 10-227619 | 8/1998 |
| JP | 10-227618 | 12/1999 |
| JP | 2001-10720 | 1/2001 |

OTHER PUBLICATIONS

Office Action Issued by State Intellectual Property Office of People's Republic of China on Nov. 26, 2004 With English Tranlsation.

* cited by examiner

FIG. 6
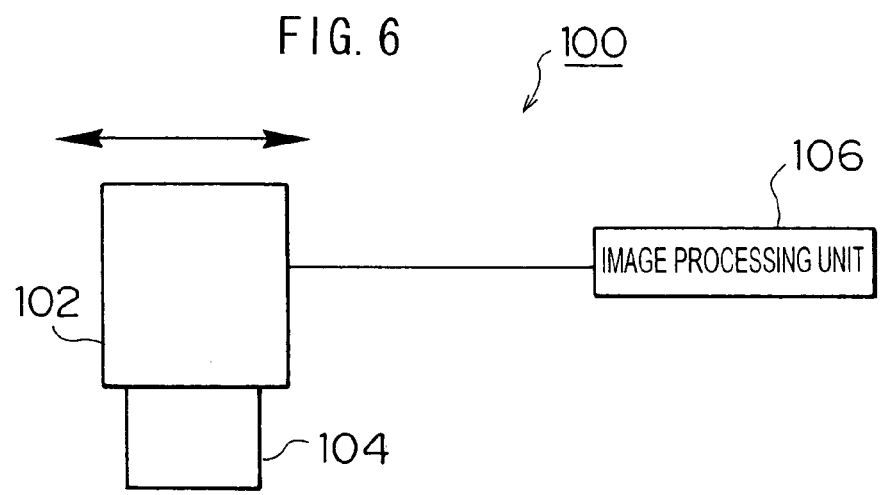
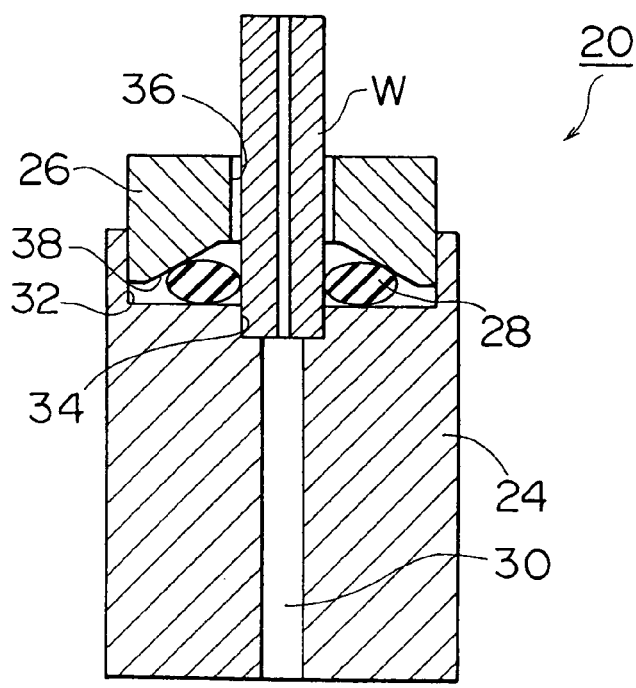

METHOD AND DEVICE FOR MEASURING INNER DIAMETER DIMENSION OF WORKS

TECHNICAL FIELD

The present invention relates to a method and device for measuring inner diameter dimension of works. More particularly, it relates to a method and device for measuring inner diameter dimension of fine cylindrical works such as ferrules.

BACKGROUND ART

Conventionally, to measure inner diameter dimension of a fine cylindrical work such as a ferrule, the operator inserts pin gauges of predetermined sizes in an inner periphery of the work. For automatic measurement, the work is placed on a V table or the like, the work is rotated with a probe of a contact type displacement gauge kept in contact with its inner periphery, and the inner diameter dimension of the work is determined from the amount of displacement of the probe. Alternatively, as disclosed in Japanese Patent Application Publication No. 8-29642, Japanese Patent Application Publication No. 10-227619, and Japanese Patent Application Publication No. 6-174433, for example, the work is placed on a V table or the like, images of its end face are picked up with a CCD camera while it is rotated, and the resulting image data is subjected to image processing to determine the inner diameter dimension of the work.

However, the method which uses pin gauges has the drawback of requiring the operator to expend a great deal of effort measuring each work manually. Also, it has the drawback of lacking accuracy because of manual work. Furthermore, it has the drawback that the pin gages, which are inserted, get worn as measurements are taken repeatedly, resulting in inaccurate measurements.

On the other hand, the method which uses automatic measurements has the drawback of taking time for measurements because the work must be rotated for each measurement. Also, it has the drawback of needing a mechanism for rotating the work, resulting in increased equipment size. Furthermore, it has the drawback that the V table or the like gets worn, resulting in inaccurate measurements because the V table or the like is rotated with a work mounted on it. Besides, it has the drawback that a contact type displacement gauge, which involves inserting the probe in the inner periphery of the work, cannot measure small-diameter works such as ferrules because there are limits to diameters that can be measured. On the other hand, the method which uses image processing has the drawback of being able to measure only end face diameters.

The present invention has been made in view of the above problems and has an object to provide an inner diameter measuring method and device which can measure inner diameter dimensions of works easily and accurately with a simple configuration.

SUMMARY OF THE INVENTION

In order to attain the above object, the present invention is directed to an inner diameter measuring method for measuring inner diameter dimension of cylindrical works, characterized by comprising the steps of: supplying compressed air to an inner periphery of a cylindrical master whose inner diameter dimension is known, detecting its back pressure, and thereby calculating a back pressure characteristic which represents a relationship between the inner diameter dimension and back pressure; and supplying compressed air to the inner periphery of the work to be measured, detecting its back pressure, and thereby measuring the inner diameter dimension of the work according to the back pressure characteristic.

The present invention supplies compressed air to the inner periphery of a work, detects changes in its back pressure, and thereby measures the inner diameter dimension of the work. The present invention can take measurements in a short time because there is no need to rotate the work. Also, it always gives accurate and stable measurements over a long period of use because no wear occurs. Also, it can make device compact because it does not need a mechanism for rotating the work.

Also, the work may be 0.05 mm to 1 mm in inner diameter.

The present invention is extremely useful in measuring the inner diameter dimension of fine-diameter works ranging from 0.05 mm to 1 mm in inner diameter because it does not need to insert a probe in the inner periphery of the work to be measured unlike conventional methods.

Regarding the back pressure characteristic, an optimum value may be calculated by a statistical technique using a plurality of masters which have some uncertainties.

Even if masters have uncertainties, the present invention provides accurate measurements by reducing the effect of uncertainties.

BRIEF DESCRIPTION OF THE DRAWINGS

FIG. 6 is a longitudinal section of a measuring table equipped with an end-face flaw detector.

THE PREFERRED EMBODIMENTS FOR CARRYING OUT THE INVENTION

Embodiments of a method and device for measuring inner diameter dimension of works according to the present invention will be described below with reference to the drawings.

Figure 1:
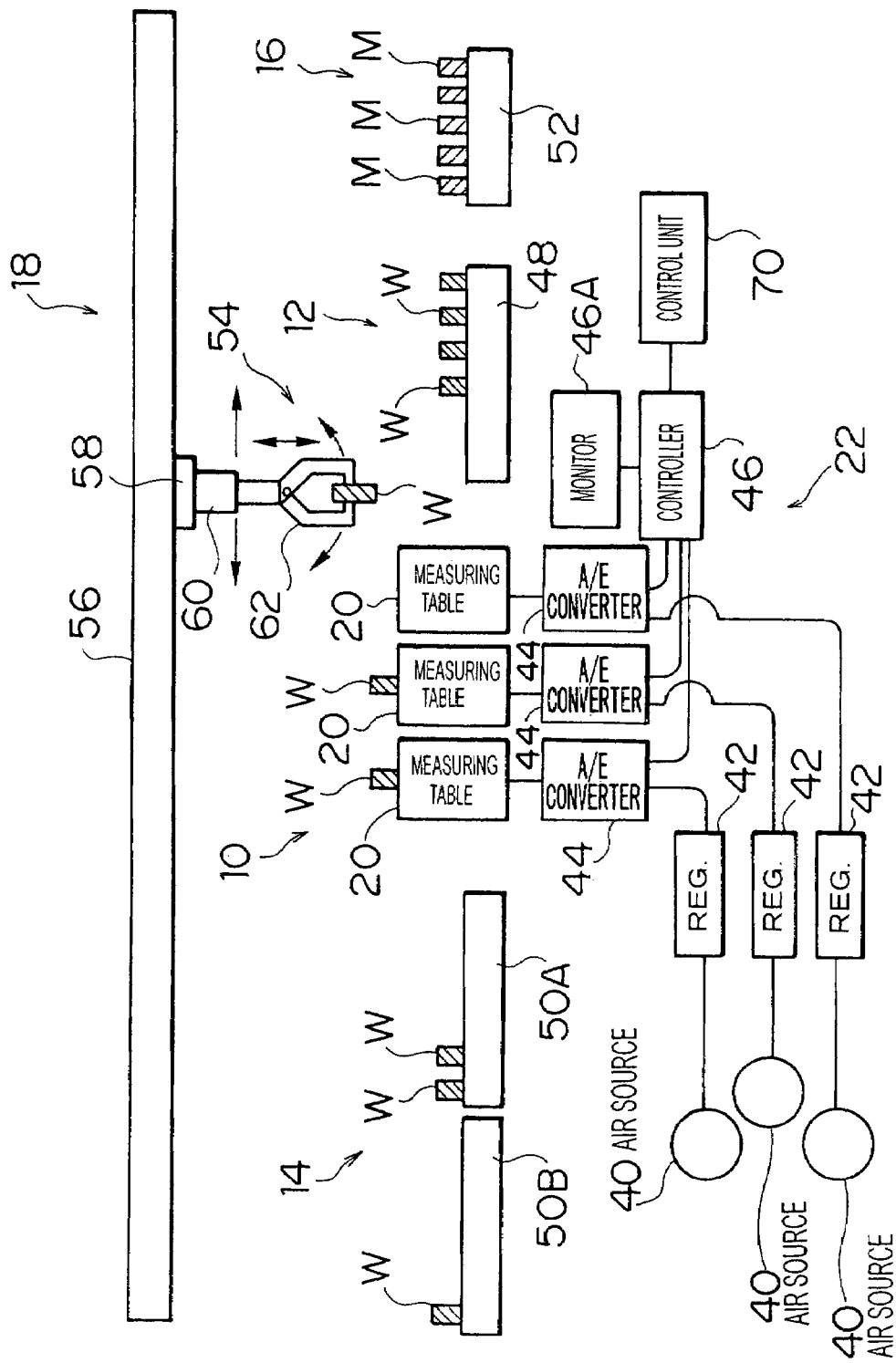
FIG. 1 is a schematic view showing an overall configuration of an inner diameter measuring device according to the present invention.

FIG. 1 is a schematic view showing an overall configuration of an inner diameter measuring device according to the present invention. As shown the drawing, the inner diameter measuring device comprises a measuring unit 10, feeding unit 12, recovery unit 14, master storage unit 16, transport unit 18, and control unit 70 and measures the inner diameter dimension of fine cylindrical works such as ferrules.

The measuring unit 10 measures the inner diameter dimension of the works W. The measuring unit 10 comprises a plurality of measuring tables 20 for holding the works W, and a plurality of air micrometers 22 for measuring the inner diameter dimensions of the works W held in the measuring tables 20.

As shown in FIGS. 2(a) and 2(b), the measuring table 20 comprises a measuring table body 24, pressing ring 26, retaining ring 28, and pressing device (not shown).

The measuring table body 24 is installed vertically and an air supply channel 30 is formed in the center of it. In the upper surface of the measuring table body 24 is a circular recess 32, at the center of which is a work receiving hole 34 with a predetermined depth. The work receiving hole 34 is provided concentrically with the air supply channel 30 and is approximately equal in diameter to the work W measured.

The pressing ring 26 has a work passage hole 36 slightly larger in diameter than the work formed in itself along its axis. The pressing ring 26 is fitted in the recess 32 formed in the upper surface of the measuring table body and is supported in the recess 32 in such a way as to be slidable in the axial direction with the inner surface of the recess 32 serving as a guide surface. On the lower surface of the pressing ring 26 is a pressing surface 38 tapering toward the center and contacting the retaining ring 28.

The retaining ring 28 is made of an elastic material and contained in the recess 32 formed in the upper surface of the measuring table body 24. It is mounted concentrically with the work receiving hole 34. When pressed against the pressing surface 38 of the pressing ring 26, the retaining ring 28 is squeezed, contracting its inner diameter. Under normal conditions (no-load conditions), the retaining ring 28 has a larger inner diameter than the outside diameter of the work W measured. Thus, the work W is inserted in the retaining ring 28 almost without touching the latter.

The pressing device (not shown) comprises, for example, a cylinder and presses the pressing ring 26 toward the measuring table body 24.

Figure 2:
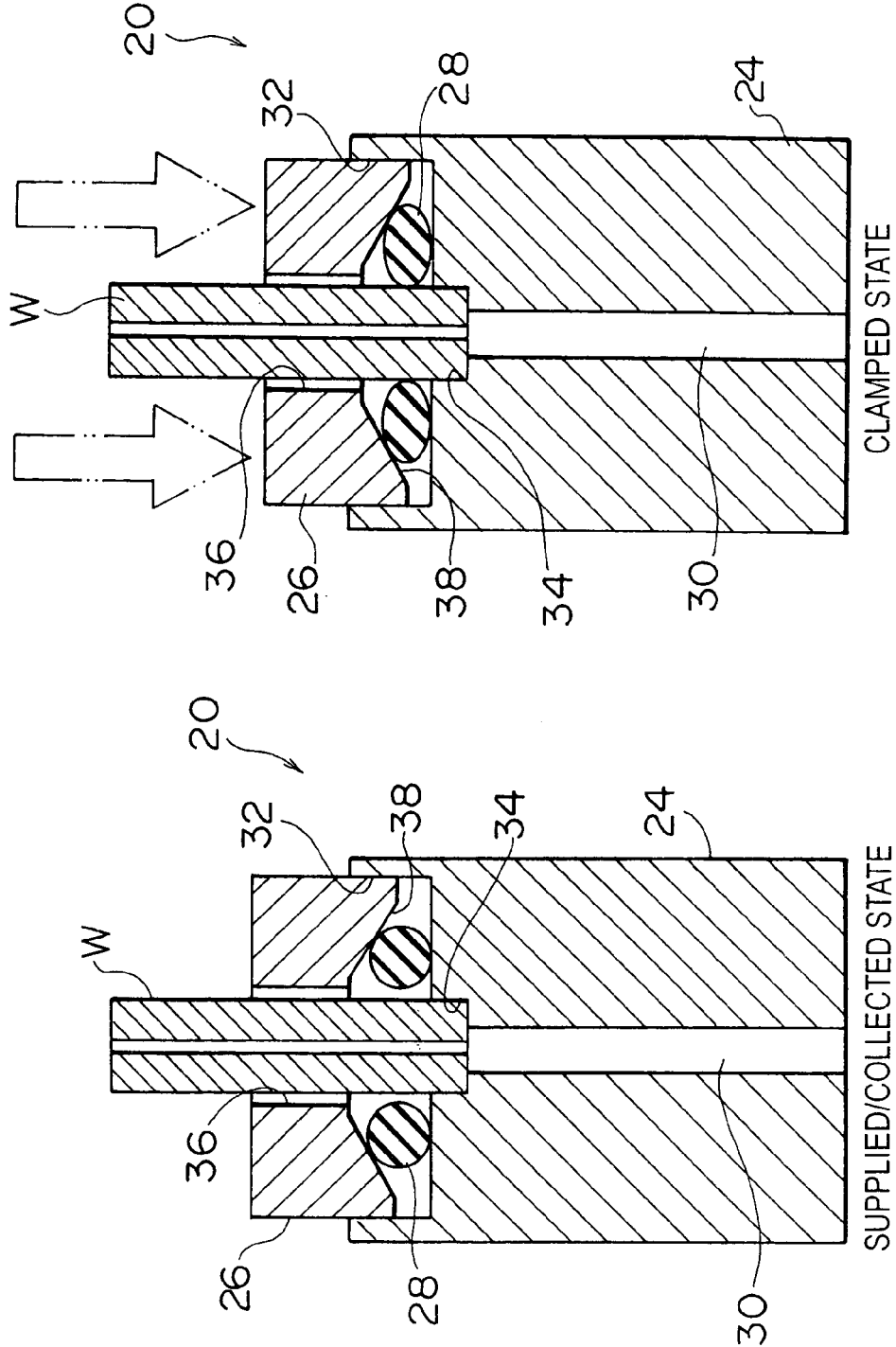
FIGS. 2(a) and 2(b) are longitudinal sections showing a configuration of a measuring table.

On the measuring table 20 with the above configuration, when the work W is inserted in the work passage hole 36 of the pressing ring 26, the tip of the work W is inserted in the work receiving hole 34 formed in the measuring table body 24, as shown in FIG. 2(*a*). In this sate, when the pressing ring 26 is pressed by the pressing device (not shown) toward the measuring table body 24 as shown in FIG. 2(*b*), the retaining ring 28 is squeezed against the pressing surface 38 of the pressing ring 26, contracting its inner diameter. Consequently, the outer surface of the work W is clamped by the retaining ring 28, holding the work W to the measuring table 20. Also, the retaining ring 28 comes into intimate contact with the outer surface of the work W, providing a seal between the work W and work receiving hole 34.

To dismount the work W, the pressing ring 26 is released. Consequently, the pressing ring 26 returns to its original position by the elastic restoring force of the retaining ring 28 while the retaining ring itself recovers its original diameter by its elastic restoring force. This releases the work W from clamping to make it removable.

The air micrometer 22 comprises an air source 40, regulator 42, A/E converter 44, and controller 46 as shown in FIG. 1.

The air source 40 supplies compressed air whose temperature and humidity is adjusted to be constant. The regulator 42 adjusts the compressed air supplied from the air source 40 to maintain it at a constant pressure. The compressed air maintained at a constant pressure by the regulator 42 is supplied to the air supply channel 30 of the measuring table body 24 via the A/E converter 44.

The compressed air supplied to the air supply channel 30 is injected and discharged through the inner periphery of the work W held on the measuring table 20. The A/E converter 44 converts the back pressure of the compressed air into an electrical signal using a built-in bellows and differential transformer and outputs it to the controller 46. Then, the controller 46 calculates the inner diameter dimension of the work W according to the electrical signal. The calculated inner diameter dimension is displayed on a monitor 46A installed on the controller 46 and is stored as data in a memory (not shown) installed in the controller 46.

The feeding unit 12 supplies the works W to be measured. It is equipped with a feeding table 48 for housing a large number of works W to be measured. The feeding table 48 is provided, for example, with a plate which has a large number of holes at certain intervals in the upper surface. Each of the holes can contain a work W to be measured.

The recovery unit 14 recovers the works W which have been measured. The recovery unit 14 comprises an OK item recovery table 50A for housing OK works (works which meet a predetermined criterion) and an NG item recovery table 50B for housing NG works (works which do not meet the predetermined criterion). The recovery tables 50A and 50B are provided with a plate which has a large number of holes at certain intervals in the upper surface as is the case with the feeding table 48. Each of the holes can contain a work W which has been measured.

The master storage unit 16 stores masters M used for zero calibration and magnification calibration of the air micrometers 22. It comprises a master storage table 52 for storing the masters M. The master storage table 52 is provided, for example, with a plate which has a large number of holes at certain intervals in the upper surface as is the case with the feeding table 48. Each of the holes can contain one master.

The transport unit 18 transports the works W to be measured from the feeding unit 12 to the measuring unit 10 and transports measured works W from the measuring unit 10 to the recovery unit 14. It also transports the masters M from the master storage unit 16 to the measuring unit 10 and transports calibrated masters M to the master storage unit 16. The transport unit 18 is equipped with a transfer robot 54. The transfer robot 54 comprises a vehicle 58 which travels along a guide rail 56 installed on a ceiling frame (not shown), an extendable arm 60 mounted on the vehicle 58, and an openable/closable hand 62 attached to the tip of the arm 60. Each work W is transported, being gripped by the hand 62.

The control unit 70 controls individual units which compose the inner diameter measuring device according to a preset motion program. It is equipped with a touch panel (not shown) as a means of entering various information.

The inner diameter measuring device, configured as described above, operates as follows. For the purposes of explanation, it is assumed that ferrules manufactured to an outside diameter size of 2.5 mm and inner diameter dimension of 0.125 mm have their inner diameter dimension d measured, accepted or rejected according to the results of measurements, and collected separately according to acceptance or rejection. Specifically, the works which satisfy a preset criterion are collected as OK works on the OK item recovery table 50A while the works which do not satisfy the criterion are collected as NG works on the NG item recovery table 50B.

Before the works W are measured, the air micrometers 22 are calibrated, i.e., they undergo zero calibration and magnification calibration. The calibrations are performed when an execute calibration signal is input in the control unit 70.

First, the control unit 70 takes the zero calibration master M out of the master storage unit 16 and transports it to the measuring unit 10 by operating the transfer robot 54. The master M transported to the measuring unit 10 is delivered and held to the measuring table 20.

To hold the master M, the master M is inserted in the work passage hole 36 of the pressing ring 26, the grip of the transfer robot 54 is released, and then the pressing ring 26 is pressed toward the measuring table body 24 by the pressing device (not shown). Consequently, the retaining ring 28 is squeezed by the pressing ring 26 and the master M is held onto the measuring table 20 being gripped by the squeezed retaining ring 28.

When the master M has its tip inserted and held in the work receiving hole 34, a gap is formed between the master M and work receiving hole 34, but it is sealed by the retaining ring 28 which is squeezed. Thus, all the air supplied to the air supply channel 30 is delivered to the inner periphery of the master M.

When the master M is held on the measuring table 20, the air source 40 is operated and the compressed air whose pressure is adjusted to be constant by the regulator 42 is supplied to the air supply channel 30 of the measuring table 20 via the A/E converter 44. The compressed air supplied to the air supply channel 30 is discharged after passing through the inner periphery of the master M. The back pressure of the compressed air is detected by the A/E converter 44 and output as an electrical signal to the controller 46. The controller 46 stores the back pressure data of the zero calibration master M outputted as the electrical signal in the built-in memory.

When the zero calibration master M has been measured, the air supply is stopped and the master M is unlocked. That is, the pressing ring 26 is freed from being pressed by the pressing device and from being clamped by the retaining ring 28. The unlocked master M is removed from the measuring table 20 and stored at its original location in the master storage unit 16 by the transfer robot 54.

Next, the transfer robot 54 takes the magnification calibration master M out of the master storage unit 16 and transports it to the measuring unit 10. The master M transported to the measuring unit 10 is similarly delivered and held to the measuring table 20. When the magnification calibration master M is held on the measuring table 20, the air source 40 is operated again and compressed air is supplied to the air supply channel 30 of the measuring table. The compressed air supplied to the air supply channel 30 is similarly discharged after passing through the inner periphery of the master M. The back pressure of the compressed air is detected by the A/E converter 44 and output as an electrical signal to the controller 46. The controller 46 stores the back pressure data of the magnification calibration master M outputted as the electrical signal in the built-in memory.

When the magnification calibration master M has been measured, the air supply is stopped and the master M is unlocked. The unlocked master M is removed from the measuring table 20 and stored at its original location in the master storage unit 16 by the transfer robot 54.

The controller 46 determines relationship (back pressure characteristic) between changes in inner diameter dimensions and changes in back pressures according to the acquired back pressure data of the zero calibration master M and the magnification calibration master M as well as on known inner diameter dimension data of the masters M. Also, it sets the measured value of the back pressure of the zero calibration master M as a reference value for measurement.

Subsequently, the inner diameter dimensions d of works are measured by detecting deviations in back pressure from the zero calibration master M.

As described above, the zero calibration master M and magnification calibration master M have their inner diameter dimensions measured accurately in advance and the operator enters these values beforehand in the controller 46 (via the touch panel (not shown) of the control unit 70). The zero calibration master M and magnification calibration master M have different inner diameter dimensions (minor norm and major norm).

This ends the calibrations of the air micrometer 22. Incidentally, the inner diameter measuring device according to this embodiment is equipped with a plurality of the air micrometers 22, and all of them are calibrated. When all the air micrometers 22 have been calibrated, the works W are started to be measured.

First, the transfer robot 54 takes the work W to be measured out of the feeding unit 12 and transports it to the measuring unit 10. The work W transported to the measuring unit 10 is delivered and held to the measuring table 20.

To hold the work W, as is the case with the holding of the masters M described above, the work W is inserted in the work passage hole 36 of the pressing ring 26, and then the pressing ring 26 is pressed toward the measuring table body 24 by the pressing device (not shown). Consequently, the retaining ring 28 is squeezed by the pressing ring 26 and the work W is held on the measuring table 20, being gripped by the squeezed retaining ring 28. At the same time, the gap between the work W and work receiving hole 34 is sealed.

When the work W is held on the measuring table 20, the air source 40 is operated, and compressed air whose pressure is adjusted to be constant by the regulator 42 is supplied to the air supply channel 30 of the measuring table 20 via the A/E converter 44. The compressed air supplied to the air supply channel 30 is discharged after passing through the inner periphery of the work W. The back pressure of the compressed air is detected by the A/E converter 44 and output as an electrical signal to the controller 46.

The controller 46 calculates the inner diameter dimension d of the work W according to the electrical signal from the A/E converter 44. That is, it calculates the inner diameter dimension d of the work W from the calculated back pressure according to the back pressure characteristic determined in advance. The calculated inner diameter dimension d is displayed on the monitor 46A installed on the controller 46 and is stored as data in the memory (not shown) installed in the controller.

This ends the inner diameter dimension measurement of one work W. When the measurement is finished, the operation of the air source 40 stops and the measuring table 20 releases the work W. That is, the pressing ring 26 is freed from being pressed by the pressing device (not shown) and from being clamped by the retaining ring 28 to unlock the work W. The unlocked work is removed from the measuring table 20 and transported to the recovery unit 14 by the transfer robot 54.

Since the recovery unit 14 is equipped with the OK item recovery table 50A for housing OK works and NG item recovery table 50B for housing NG works, the recovered work W is stored in either the OK item recovery table 50A or NG item recovery table 50B according to the results of measurements. Specifically, the control unit 70 determines whether the inner diameter dimension d of the recovered work W satisfies the preset criterion. If the work W satisfies the criterion, it is stored in the OK item recovery table 50A, but if it does not satisfy the criterion, it is stored in the NG item recovery table 50B.

The above processes complete the measurement operation of one work. As similar operations are repeated, all the works W stored in the feeding table 48 of the feeding unit 12 are measured. Since the inner diameter measuring device according to this embodiment has a plurality of the measuring tables 20, 20, . . . in the measuring unit 10, it proceeds with measurements while supplying works W one after another to these measuring tables 20, 20, . . . In other words, works W are supplied one after another to the measuring tables 20, 20, . . . in such a way as to make up for each work which finishes being measured. This makes it possible to operate the transfer robot 54 efficiently, eliminating waiting time for measurements, and thus achieve efficient measurements.

In this way, the inner diameter measuring device according to this embodiment supplies compressed air to the inner periphery of a work and measures the inner diameter dimension d of the work W according to changes in the back pressure of the compressed air. This method can measure the inner diameter dimension of the work without rotating or moving the work W, and thus can take measurements in a short time. Also, it can make device compact because it does not need a mechanism for rotating or moving the works.

Also, the this embodiment can effectively measure the inner diameter dimensions of even fine-diameter works such as ferrules because it does not insert a probe in the work unlike conventional methods which employs contact type displacement gauges. In this way, since the inner diameter measuring device according to this embodiment takes non-contact measurements of inner diameter dimensions, it is especially useful in measuring the inner diameter dimensions of fine-diameter works. Especially, it is useful in measuring dimensions of fine cylindrical works such as ferrules ranging from 0.05 mm to 1 mm in inner diameter.

Figure 3:
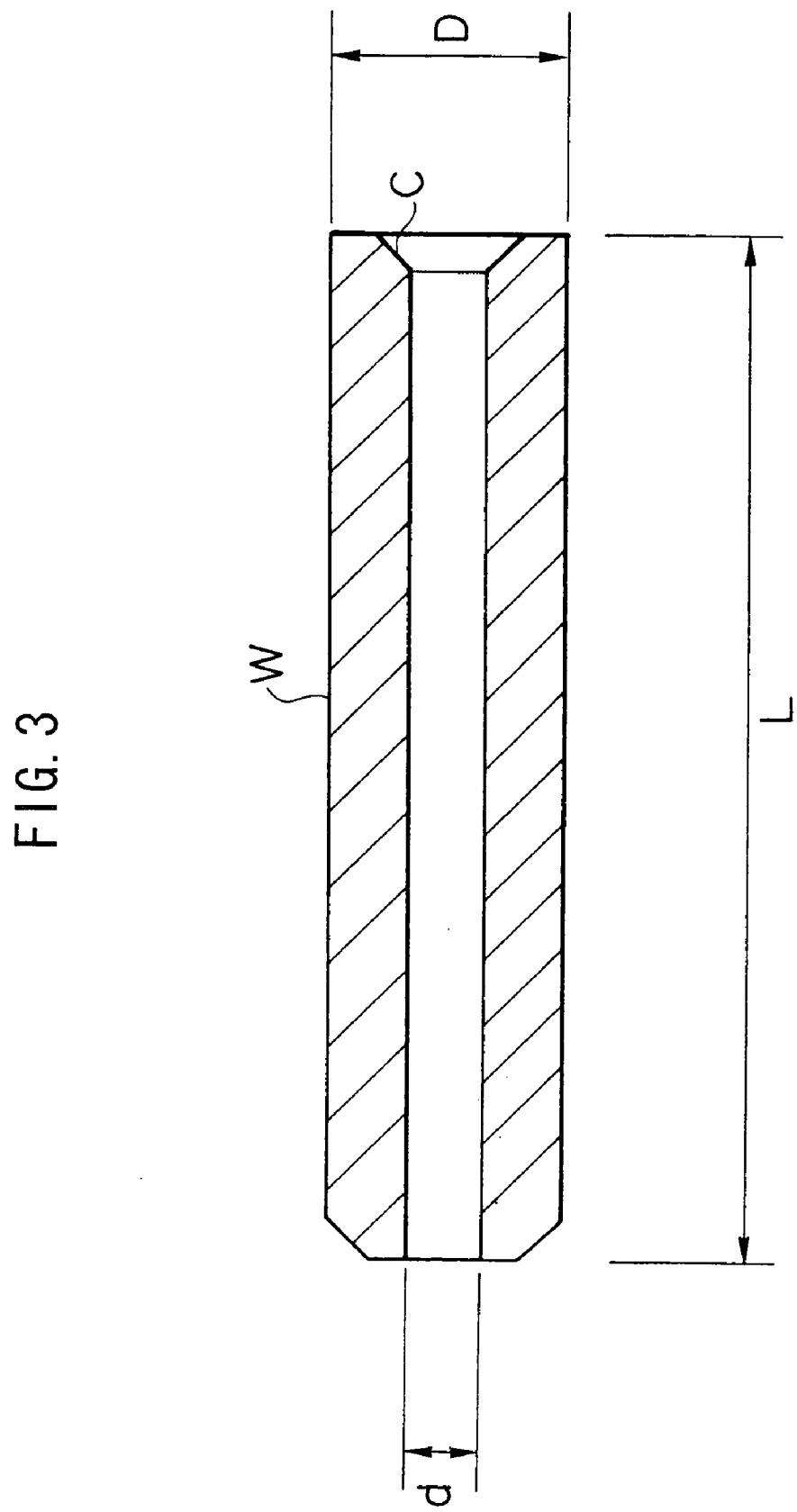
FIG. 3 is a side section showing a configuration of a work.

Also, the inner diameter measuring device according to this embodiment is especially useful in measuring the inner diameter dimensions of long thin works such as ferrules, i.e., works W which have large axial lengths in relation to their outside diameter sizes. That is, as shown in FIG. 3, generally a ferrule has an internal chamfer C on an end, and when compressed air is supplied to the inner periphery of a chamfered work W, the back pressure may not be measured correctly due to the influence of the chamfer C. However, when the axial length L is large enough in relation to the outside diameter size D, even if there is an internal chamfer C on an end, its effect can be eliminated and stable measurements can be ensured. Thus, preferably, the work W to be measured satisfies the relationship L/d>5, where d is the inner diameter dimension and L is the length.

Incidentally, although this embodiment recovers measured works in the recovery unit 14 by sorting them into OK works and NG works, it is alternatively possible to divide them more finely into ranks.

Also, although according to this embodiment, the measuring unit 10 is equipped with a plurality of the measuring tables 20, it is alternatively possible to provide only one measuring table 20. However, by installing a plurality of the measuring tables 20 as with this embodiment, it is possible to measure a plurality of works W efficiently.

Next, description will be given of a second embodiment of the method and device for measuring inner diameter dimension of works according to the present invention.

This embodiment concerns another calibration method for the air micrometers 22 in the above described inner diameter measuring device.

As described above, since the method and device for measuring inner diameter dimension of works according to the present invention take non-contact measurements, it is useful in measuring the inner diameter dimensions of fine-diameter works.

However, as the diameter of the work W to be measured gets smaller, it becomes more difficult to make masters.

Thus, in this embodiment, description will be given of a method for calibrating the air micrometers 22 using masters which have some uncertainties.

First, a plurality of masters M which have some uncertainties are prepared. In this case, assuming that the works to be measured are 0.05 mm to 1 mm in inner diameter, a plurality of masters M which have uncertainties on the order of 0.5 μm are prepared.

The calibration involves measuring the back pressures of the plurality of masters M which have the uncertainties and calculating an appropriate back pressure characteristic from measurement results using the least squares method.

In this way, by calculating an optimum value using a plurality of masters which have some uncertainties and a statistical technique such as the least squares method, it is possible to take accurate measurements, reducing the effect of the uncertainties contained in the masters.

The method for measuring the optimum value is not limited to the least squares method. Various statistical techniques are available including those which involve taking an average of measured values.

These masters M are stored in the master storage table 52 of the master storage unit 16 and transported one by one to the measuring tables 20 by the transfer robot 54.

Next, description will be given of a third embodiment of the method and device for measuring inner diameter dimension of works according to the present invention.

With the inner diameter measuring device of the above embodiments, the masters M stored in the master storage unit 16 are transported to the measuring tables 20 by the transfer robot 54 to calibrate the air micrometers 22. This embodiment provides a method for calibrating the air micrometers 22 without transporting the masters M. Incidentally, except for the calibration mechanism, the configuration of this embodiment is the same as the inner diameter measuring device of the above embodiments, and thus, only the calibration mechanism will be described here.

Figure 4:
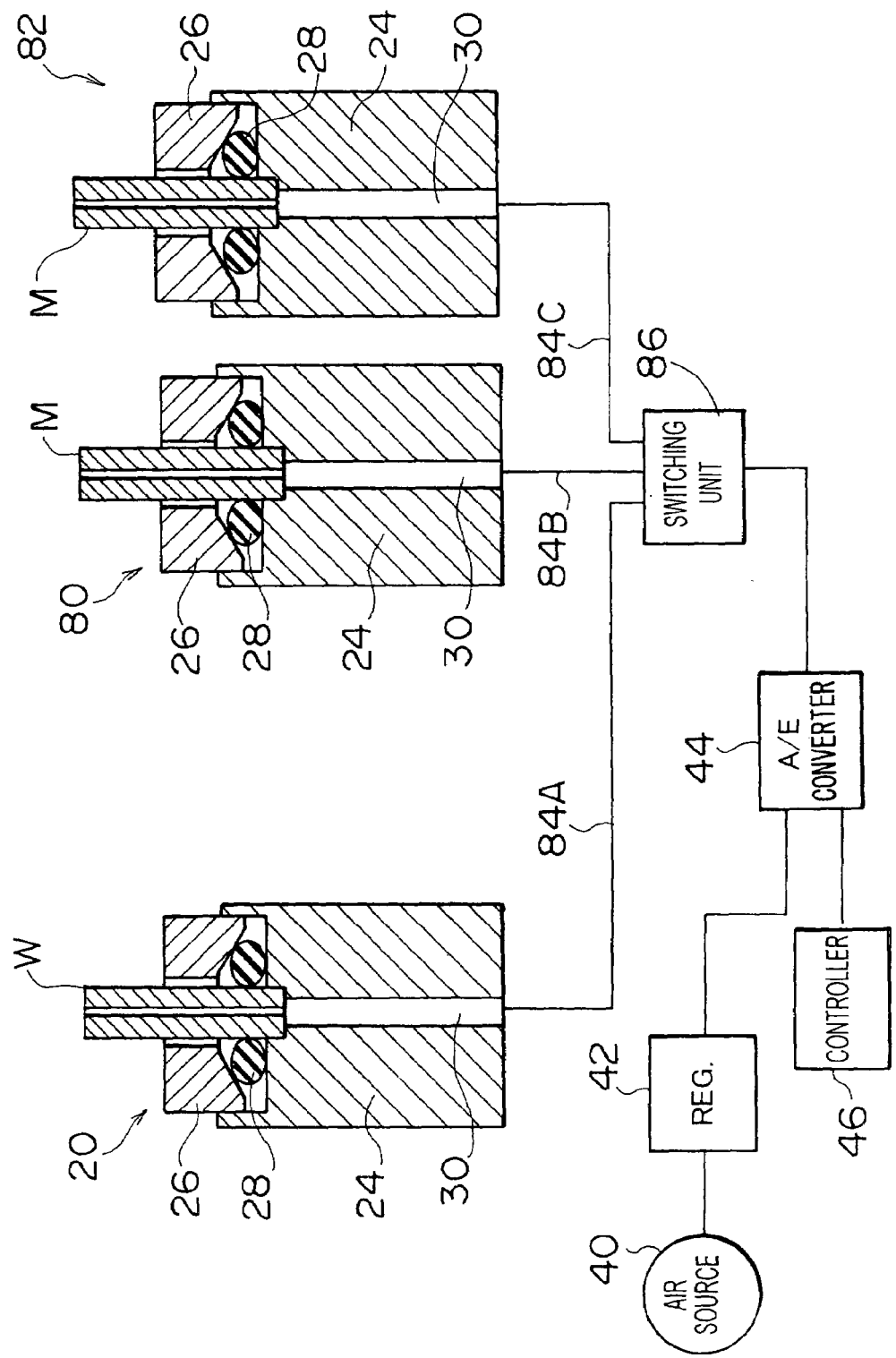
FIG. 4 is a block diagram showing a configuration of a calibration mechanism.

FIG. 4 is a block diagram showing the calibration mechanism. As shown in the drawing, a zero calibration master measuring table 80 and magnification calibration master measuring table 82 are installed near the measuring table 20. The zero calibration master measuring table 80 and magnification calibration master measuring table 82 have the same configuration as the measuring table 20. Thus, each of them comprises the measuring table body 24, pressing ring 26, retaining ring 28, and pressing device (not shown), where the master is held by the retaining ring 28 which is squeezed by the pressing ring 26.

The air supply channels 30, 30, and 30 of the measuring tables 20, 80, and 82 are connected with branch pipes 84A, 84B, and 84C, respectively. All the branch pipes 84A, 84B, and 84C are connected to a switching unit 86. The switching unit 86 is supplied with compressed air from the air source 40 via the regulator 42 and A/E converter 44 and supplies the compressed air selectively to the branch pipe 84A, 84B, or 84C. In other words, the switching unit 86 selectively switches the destination of the compressed air supplied from the air source 40. This switching is performed according to a drive signal from the control unit 70.

The calibration mechanism, configured as described above, operates as follows.

First, the transfer robot 54 takes the zero calibration master M out of the master storage unit 16 and transports it to the measuring unit 10. The zero calibration master M transported to the measuring unit 10 is delivered and held to the zero calibration master measuring table 80.

Next, the transfer robot 54 takes the magnification calibration master M out of the master storage unit 16 and transports it to the measuring unit 10. The magnification calibration master M transported to the measuring unit 10 is delivered and held to the magnification calibration master measuring table 82.

When the masters are held on the master measuring tables 80 and 82, the air source 40 is operated, and compressed air whose pressure is adjusted to be constant by the regulator 42 is supplied to the switching unit 86 via the A/E converter 44.

Here, the switching unit 86 is connected to the zero calibration master measuring table 80, and the compressed air is supplied to the zero calibration master measuring table 80. The compressed air supplied to the zero calibration master measuring table 80 is discharged after passing through the inner periphery of the zero calibration master M and the back pressure of the compressed air is detected by the A/E converter 44. The detected value of the back pressure is output as an electrical signal to the controller 46. The controller 46 stores the back pressure data of the zero calibration master M outputted as an electrical signal in the built-in memory.

When the zero calibration master M has been measured, the air supply is stopped. Then, the switching unit 86 switches the destination of the compressed air from the zero calibration master measuring table 80 to the magnification calibration master measuring table 82. In this state, the air source 40 is operated again, and compressed air whose pressure is adjusted to be constant by the regulator 42 is supplied to the switching unit 86 via the A/E converter 44. Then, it is supplied to the magnification calibration master measuring table 82 via the switching unit 86. The compressed air supplied to the magnification calibration master measuring table 82 is discharged after passing through the inner periphery of the magnification calibration master M and the back pressure of the compressed air is detected by the A/E converter 44. The detected value of the back pressure is output as an electrical signal to the controller 46. The controller 46 stores the back pressure data of the magnification calibration master M outputted as an electrical signal in the built-in memory.

This ends the measurements of the zero calibration master M and magnification calibration master M. The controller 46 determines relationship (back pressure characteristic) between changes in inner diameter dimensions and changes in back pressures according to the measured back pressures of the zero calibration master M and magnification calibration master M as well as on known inner diameter dimension data of the masters M. Also, it sets the measured value of the back pressure of the zero calibration master M as a reference value for measurement.

The above processes complete the calibrations of the air micrometers 22. Then, the switching unit 86 changes its connection from the magnification calibration master measuring table 82 to the measuring table 20. Consequently, works W are measured one after another on the measuring table 20.

In this way, the calibration mechanism according to this embodiment makes it possible to calibrate the air micrometers 22 easily by simply switching the destination of compressed air. Calibrations need to be performed periodically to maintain measurement accuracy, and the calibration mechanism of this embodiment can perform calibration in a short time because it does not need to change masters M. This makes it possible to reduce the time spent on calibrations greatly and improve processing efficiency.

When the work W to be measured is changed, so are the zero calibration master M and magnification calibration master M which are mounted on the zero calibration master measuring table 80 and magnification calibration master measuring table 82, accordingly.

Next, description will be given of a fourth embodiment of the method and device for measuring inner diameter dimension of works according to the present invention.

The inner diameter measuring device according to this embodiment differs from the inner diameter measuring device of the first embodiment in that it is further equipped with an air-leak checking mechanism. Otherwise, the configuration of this embodiment is the same as the inner diameter measuring device of the first embodiment described above, and thus, only the air-leak checking mechanism will be described here.

Figure 5:
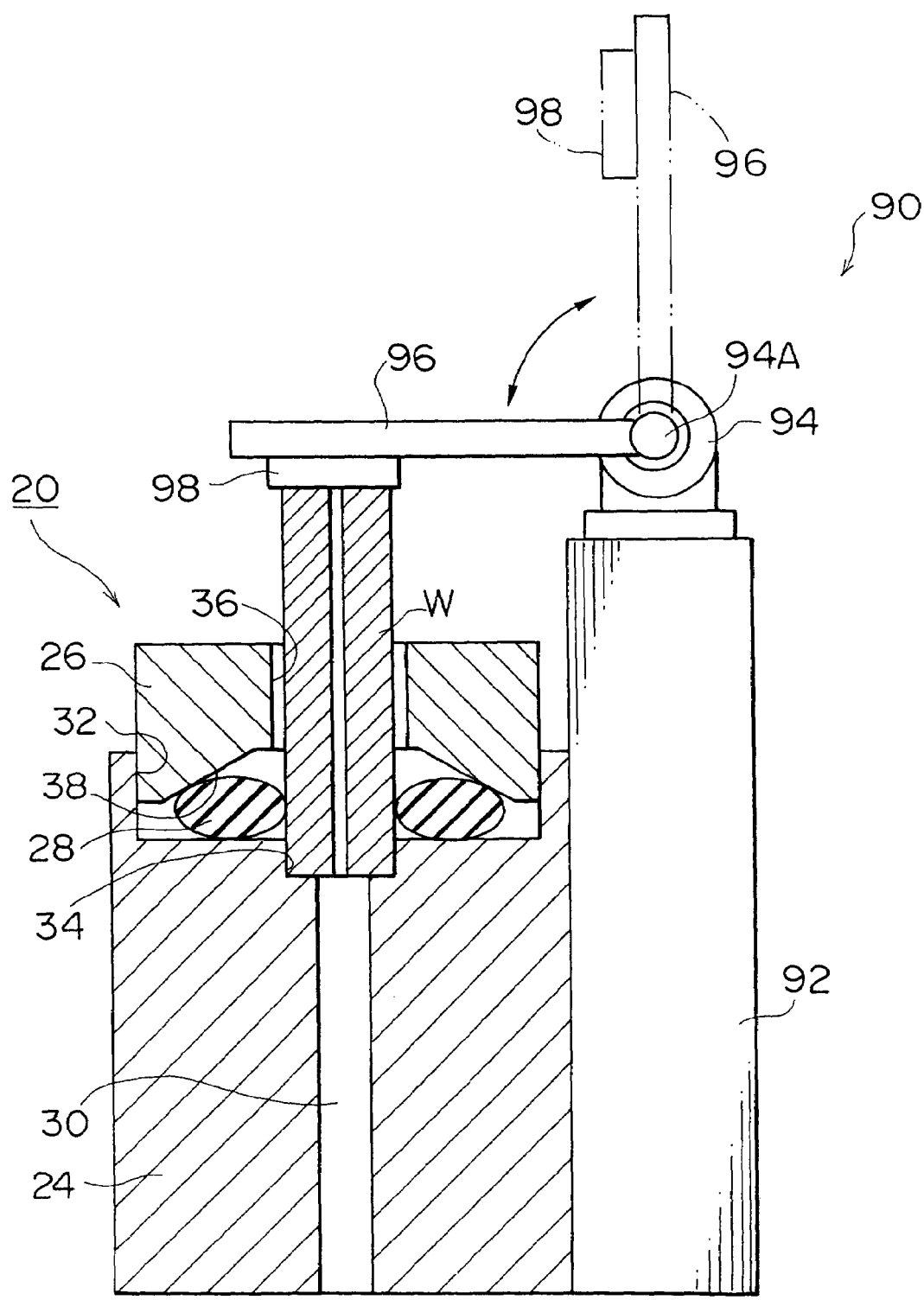
FIG. 5 is a longitudinal section of a measuring table equipped with a sealing device.

FIG. 5 is a longitudinal section of the measuring table 20 equipped with a sealing device 90 for checking for air leaks. As shown in the drawing, the measuring table body 24 is flanked by a vertical column 92. On top of the column 92 is a motor 94, whose output shaft 94A is fitted with an arm 96. The arm 96 is mounted at right angles to the output shaft 94A. It oscillates between a sealing position (indicated by a solid line in FIG. 5) and waiting position (indicated by a two-dot chain line) when the motor 94 is operated. The tip of the arm 96 is fitted with a rubber pad 98 in disk shape, which is pressed against the top face of the work or master held on the measuring table 20, thereby sealing the upper end of the inner periphery of the work or master.

The work or master has its inner periphery sealed by the rubber pad 98 when the arm 96 is located at the sealing position, and has it unsealed when the arm 96 is located at the waiting position.

The sealing device 90 configured as described above can be used to check for air leaks as follows.

The work W transported to the measuring unit 10 by the transfer robot 54 is held on the measuring table 20.

As described above, the work W is held on the measuring table 20 with its tip inserted in the work receiving hole 34. The gap formed between the work W and work receiving hole 34 is sealed by the retaining ring 28.

Thus, if the work W is held securely, the air supplied from air supply channel 30 will not leak. However, if the work W is not held properly, air may leak from between the work W and work receiving hole 34.

Therefore, when the work W is held to the measuring table 20, it is checked for air leaks as follows to make sure that it is held securely on the measuring table 20.

First, when the work W is held to the measuring table 20, the motor 94 is operated and the arm 96 swings from the waiting position to the sealing position. Consequently, the pad 98 attached to the tip of the arm 96 comes into contact with the upper end face of the work W held on the measuring table 20 to seal the upper end of the inner periphery of the work W. In this state, the air source 40 is operated and compressed air is supplied to the air supply channel 30 of the measuring table 20. The back pressure of the compressed air is detected by the A/E converter 44 and output as an electrical signal to the controller 46. The controller 46 checks for air leaks according to back pressure outputted as the electrical signal. Specifically, since any air leak will show up as a change in the back pressure, changes in the back pressure is checked for, thereby to check for air leaks from the measuring table 20 which holds the work W.

When the checking is finished, air supply stops, the motor 94 is operated again, and the arm 96 returns to the waiting position. If it is determined that there is no air leak, normal measurements are taken subsequently.

On the other hand, if it is determined that there are air leaks, the work W is held anew. Specifically, the transfer robot 54 picks up the work W and holds it again to the measuring table 20. Then, air leaks are checked for, using the same procedures as above. If it is determined again that there are air leaks, the measurement is stopped, suspecting an equipment failure, and a warning is issued (e.g., the warning is displayed on the monitor 46A or a buzzer is sounded). Consequently, the operator performs a maintenance operation and the like according to the warning.

In this way, since the inner diameter measuring device according to this embodiment is equipped with the air-leak checking mechanism, it can eliminate wrong measurements caused by air leaks and always obtain accurate measurements.

Incidentally, an air-leak check is made each time a measurement is taken, including measurements of the masters M.

Also, although according to this embodiment, the sealing device 90 is attached to the measuring table 20, mechanisms for sealing the upper end of the inner periphery of the work or master are not limited to this. For example, such a mechanism may be installed on the transfer robot 54.

Besides, the air-leak checking mechanism according to this embodiment can be applied to the inner diameter measuring device of the second and third embodiments as well as to the inner diameter measuring device of the first embodiment.

Next, description will be given of a fifth embodiment of the method and device for measuring inner diameter dimension of works according to the present invention.

The inner diameter measuring device according to this embodiment differs from the inner diameter measuring device of the first embodiment in that it is further equipped with a mechanism for inspecting the end faces of works for flaws. Otherwise, the configuration of this embodiment is the same as the inner diameter measuring device of the first embodiment described above, and thus, only the mechanism for end-face flaw inspection will be described here.

FIG. 6 is a longitudinal section of the measuring table 20 equipped with an end-face flaw detector 100. The end-face flaw detector 100 uses a CCD camera to pick up images of an end face of a work W held on the measuring table 20, and inspects the end face of the work for flaws according to the resulting image data.

As shown in FIG. 6, a CCD camera 102 is installed above the measuring table 20. It is equipped with an AF lens unit 104. The AF lens unit 104, driven by an AF lens drive device (not shown), is focused on the end face of the work W held on the measuring table 20. Then, images of the end face of the work W is magnified by the AF lens unit 104 and picked up by a CCD contained in the CCD camera 102.

The image data of the end face of the work W shot by the CCD camera 102 is output to an image processing unit 106, which then processes the image data to inspect the end face of the work for flaws.

Incidentally, the CCD camera 102 is moved between a waiting position and measuring position by a robot (not shown). It is usually located at a retracted position (the waiting position) away from the measuring table 20 and moves to above the measuring table 20 only for flaw inspection.

The inner diameter measuring device with the above configuration according to this embodiment operates as follows.

When the work W is transported to the measuring unit 10 by the transfer robot 54 and held on the measuring table 20, its inner diameter dimension is measured using the procedures of the above embodiments. When the inner diameter dimension of the work W has been measured, the CCD camera 102 is moved from the waiting position to the measuring position by the robot (not shown).

When the CCD camera 102 moves to the measuring position, the AF lens unit 104 is driven and focused on the end face of the work W held on the measuring table 20. Then, images of the end face of the work W is magnified by the AF lens unit 104 and picked up by a CCD contained in the CCD camera 102.

The image data of the end face of the work W shot by the CCD camera 102 is output to an image processing unit 106, which then processes the image data to inspect the end face of the work for flaws.

After the inspection, the robot (not shown) is operated again and the CCD camera 102 returns to the waiting position.

The above processes complete the inner diameter measurements of the work W including the end-face flaw inspection. Then, the work W is recovered to the recovery unit 14, being sorted according to the results of the inner diameter measurements including the results of the end-face flaw inspection. In other words, the work W is recovered, being classified into either an OK work or NG work.

In this way, the inner diameter measuring device according to this embodiment can inspect the end faces of works for flaws in addition to normal measurements of inner diameter dimensions. This eliminates the need to inspect the end faces for flaws separately, and thus improves the efficiency of work product inspections.

Incidentally, although this embodiment only inspects the end face of the work for flaws according to image data of the end face of the work W shot by the CCD, it is also possible to determine the outside diameter size of the work W, inner diameter dimension at its end face, eccentricity between the outside diameter and inner diameter dimension, etc. through image processing according to the image data.

Also, the end-face flaw detector 100 according to this embodiment can be applied to the inner diameter measuring device of the second to fourth embodiments as well as to the inner diameter measuring device of the first embodiment.

INDUSTRIAL APPLICABILITY

As described above, the present invention can measure the inner diameter dimension of works without rotating the works, and thus can take measurements in a short time. Also, it can make device compact because it does not need a mechanism for rotating the works. Furthermore, it always gives accurate and stable measurements over a long period of use because non-contact measurements do not cause wear.

The invention claimed is:

1. An inner diameter measuring method for measuring an inner diameter dimension of a cylindrical work without inserting a probe into the cylindrical work, comprising the steps of:

supplying compressed air to an inner periphery of a cylindrical master whose inner diameter dimension is known, detecting its back pressure, and thereby calculating a back pressure characteristic which represents a relationship between the inner diameter dimension and the back pressure; and supplying compressed air to an inner periphery of the work to be measured, detecting its back pressure, and thereby measuring the inner diameter dimension of the work according to the back pressure characteristic.

2. The inner diameter measuring method as defined in claim 1, wherein the work is 0.05 mm to 1 mm in inner diameter.

3. The inner diameter measuring method as defined in claim 1, wherein an optimum value of the back pressure characteristic is calculated by a statistical technique using a plurality of masters which have some uncertainties.

4. The inner diameter measuring method as defined in claim 1, wherein the step of supplying compressed air to an inner periphery of the work to be measured is performed sealingly engaging an end face of the work to be measured against a source of said compressed air with the inner periphery of the work in communication with an externally positioned outlet of a compressed air supply passage.

5. An inner diameter measuring device which measures an inner diameter dimension of a cylindrical work without inserting a probe into the cylindrical work, comprising:
   a work holding device which holds a work or a master whose inner diameter dimension is known;
   an air supply device which supplies compressed air to an inner periphery of the work or master held by the work holding device;
   a back pressure detecting device which detects back pressure of the compressed air supplied by the air supply device to the inner periphery of the work or master;
   a back pressure characteristic calculating device which calculates a back pressure characteristic which represents a relationship between the inner diameter dimension and back pressure according to a detected value of the back pressure of the master detected by the back pressure detecting device; and
   an inner diameter calculating device which calculates the inner diameter dimension of the work from the back pressure of the work detected by the back pressure detecting device, according to the back pressure characteristic.

6. The inner diameter measuring device as defined in claim 5, wherein the work is 0.05 mm to 1 mm in inner diameter.

7. The inner diameter measuring device as defined in claim 5, further comprising:
   a work feeding device which feeds a work to be measured to the work holding device;
   a work recovering device which recovers the work from the work holding device after measurement; and
   a sorting device which sorts works recovered by the work recovering device into predetermined ranks according to calculation results produced by the inner diameter calculating device.

8. The inner diameter measuring device as defined in claim 5, comprising a plurality of the work holding devices and back pressure detecting devices.

9. The inner diameter measuring device as defined in claim 5, further comprising:
   an image pickup device which picks up an image of an end face of the work held by the work holding device; and
   a flaw inspecting device which inspects an end face of the work for flaws according to the image of the end face of the work projected on the image pickup device.

10. The inner diameter measuring device as defined in claim 5, wherein said work holding device comprises a holding mechanism which is adapted for sealingly engaging an end face of the work to be measured against a source of said compressed air with the inner periphery of the work in communication with an externally positioned outlet of a compressed air supply passage.

11. The inner diameter measuring device as defined in claim 10, wherein said holding mechanism comprises a seal and a pressing mechanism for compressing said seal into engagement with the outer periphery of the work and around the outlet of the compressed air supply passage.

12. An inner diameter measuring device which measures an inner diameter dimension of a cylindrical work, comprising:
   a work holding device which holds a work or a master whose inner diameter dimension is known; an air supply device which supplies compressed air to an inner periphery of the work or master held by the work holding device; a back pressure detecting device which detects back pressure of the compressed air supplied by the air supply device to the inner periphery of the work or master;
   a back pressure characteristic calculating device which calculates a back pressure characteristic which represents a relationship between the inner diameter dimension and back pressure according to a detected value of the back pressure of the master detected by the back pressure detecting device; and
   an inner diameter calculating device which calculates the inner diameter dimension of the work from the back pressure of the work detected by the back pressure detecting device, according to the back pressure characteristic,
   wherein the work holding device and/or the master holding device comprises:
   a holding device body in which a work receiving hole is formed to insert the work or master along an axis:
   an elastically deformable retaining ring which is installed at an opening of the work receiving hole and through which the work or master is inserted in the work receiving hole;
   a pressing member which is capable of going in and out of the holding device body through the retaining ring and which presses the retaining ring against the holding device body and thereby causes the retaining ring to deform elastically and contract its inner diameter; and
   an air supply channel which is communicated with the work receiving hole and supplies compressed air to the work receiving hole,
   wherein after the work or master is inserted in the work receiving hole through the retaining ring, the inner diameter measuring device clamps and fastens the outer surface of the work or master in the work receiving hole with the inner periphery of the retaining ring and seals the opening of the work receiving hole with the retaining ring by pressing the retaining ring with the pressing device and causing the retaining ring to contract its inner diameter.

13. The inner diameter measuring device as defined in claim 12, further comprising:
   a blocking device which blocks an open end of the work held by the work holding device and/or the master held by the master holding device; and
   an air leak detecting device which detects leakage of air supplied to the work receiving hole of the work holding device according to the detected value of the back pressure of the work detected by the back pressure detecting device and/or detecting leakage of air supplied to the work receiving hole of the master holding device according to the detected value of the back pressure of the master detected by the back pressure detecting device.

* * * * *